(12) United States Patent
Liu et al.

(10) Patent No.: US 12,342,305 B2
(45) Date of Patent: Jun. 24, 2025

(54) METHOD AND DEVICE FOR PROCESSING TIMING ADVANCE (TA), AND METHOD AND DEVICE FOR SENDING INDICATION INFORMATION

(71) Applicant: ZTE CORPORATION, Shenzhen (CN)

(72) Inventors: Kun Liu, Shenzhen (CN); Bo Dai, Shenzhen (CN); Weiwei Yang, Shenzhen (CN); Huiying Fang, Shenzhen (CN); Luanjian Bian, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 560 days.

(21) Appl. No.: 17/424,136

(22) PCT Filed: Jan. 19, 2020

(86) PCT No.: PCT/CN2020/073033
§ 371 (c)(1),
(2) Date: Jul. 19, 2021

(87) PCT Pub. No.: WO2020/151624
PCT Pub. Date: Jul. 30, 2020

(65) Prior Publication Data
US 2022/0104158 A1    Mar. 31, 2022

(30) Foreign Application Priority Data

Jan. 21, 2019  (CN) .......................... 201910056607.4

(51) Int. Cl.
*H04W 4/00* (2018.01)
*H04W 56/00* (2009.01)
(Continued)

(52) U.S. Cl.
CPC ....... *H04W 56/005* (2013.01); *H04W 56/001* (2013.01); *H04W 72/0446* (2013.01);
(Continued)

(58) Field of Classification Search
None
See application file for complete search history.

(56) References Cited

U.S. PATENT DOCUMENTS

| 2010/0220713 | A1* | 9/2010 | Tynderfeldt | ...... | H04W 56/0045 370/350 |
| 2010/0232364 | A1* | 9/2010 | Hsu | ..................... | H04W 74/085 370/328 |

(Continued)

FOREIGN PATENT DOCUMENTS

| CN | 106851813 A | 6/2017 |
| CN | 109565774 A | 4/2019 |

(Continued)

OTHER PUBLICATIONS

Huawei et al., "Feature Lead Summary of Support for Transmission in Preconfigured UL Resources", *3GPP TSG RAN WG1 Meeting #95 R1-1813717*, Nov. 13, 2018 (Nov. 13, 2018), sections 1-4.

(Continued)

*Primary Examiner* — Zewdu A Beyen
(74) *Attorney, Agent, or Firm* — Morgan, Lewis & Bockius LLP

(57) ABSTRACT

Provided are a method and a device for processing a timing advance (TA), and a method and a device for sending indication information. One of the methods includes: in response to a first condition being satisfied, determining that a TA of a terminal is in an invalid state; where the first condition includes at least one of the followings: in response to the terminal being a stationary terminal, a TA timer times out and a change amount of a first measurement value
(Continued)

exceeds a first threshold; or in response to the terminal being a non-stationary terminal, the TA timer times out, or the change amount of the first measurement value exceeds the first threshold, or the TA timer times out and the change amount of the first measurement value exceeds the first threshold.

13 Claims, 8 Drawing Sheets

(51) Int. Cl.
    *H04W 72/0446*      (2023.01)
    *H04W 72/0453*      (2023.01)
    *H04W 74/04*      (2009.01)
    *H04W 74/08*      (2009.01)
    *H04W 74/0833*      (2024.01)

(52) U.S. Cl.
    CPC ....... *H04W 72/0453* (2013.01); *H04W 74/04* (2013.01); *H04W 74/0833* (2013.01); *H04W 74/0866* (2013.01)

(56) References Cited

U.S. PATENT DOCUMENTS

| | | | | |
|---|---|---|---|---|
| 2019/0159156 A1* | 5/2019 | Abedini | ............ | H04W 56/0005 |
| 2019/0215048 A1* | 7/2019 | Cirik | ...................... | H04W 76/19 |
| 2020/0107389 A1* | 4/2020 | Charbit | ................. | H04W 76/27 |
| 2020/0107396 A1* | 4/2020 | Wang | ..................... | H04W 72/23 |

FOREIGN PATENT DOCUMENTS

| | | | | |
|---|---|---|---|---|
| CN | 110536385 A | 12/2019 | | |
| CN | 110536470 A | 12/2019 | | |
| CN | 110536471 A | 12/2019 | | |
| WO | WO-2018070908 A1 * | 4/2018 | ........ | H04W 52/0216 |

OTHER PUBLICATIONS

International Search Report for Application No. PCT/CN2020/073033, dated Apr. 9, 2020, 4 pages including English translation.

* cited by examiner

In response to a first condition being satisfied, determine a timing advance (TA) of a terminal is in an invalid state; where the first condition includes at least one of the followings: in response to the terminal being a stationary terminal, a TA timer times out and a change amount of a first measurement value exceeds a first threshold; or in response to the terminal being a non-stationary terminal, the TA timer times out, or the change amount of the first measurement value exceeds the first threshold, or the TA timer times out and the change amount of the first measurement value exceeds the first threshold ⟋ 101

FIG. 1

In response to a TA of a terminal being in an invalid state, execute one of the following operations: the terminal sends a random access signal used for a non-contention based random access procedure; the terminal sends a random access signal on a first-type resource; the terminal sends a random access signal used for a contention based random access procedure; the terminal receives from the base station signaling that triggers a non-contention based random access procedure; or the terminal receives from the base station signaling that triggers a contention based random access procedure ⟋ 201

FIG. 2

A terminal sends first indication information to a base station; where the first indication information indicates at least one of the followings: a TA of the terminal is in an invalid state; the terminal fails to receive from the base station hybrid automatic repeat request acknowledgement information feedback information for uplink data sent on a first-type resource; the coverage enhancement level of the terminal changes; the serving cell of the terminal changes; the number of repeatedly sending by the terminal the uplink data sent on the first-type resource changes; or the service mode of the terminal corresponding to the uplink data sent on the first-type resource changes ⟋ 301

FIG. 3

In response to a first condition being satisfied, a base station determines that a TA of a terminal is in an invalid state; where the first condition includes at least one of the followings: in response to the terminal being a stationary terminal, a TA timer times out and a change amount of a first measurement value exceeds a first threshold; or in response to the terminal being a non-stationary terminal, the TA timer times out, or the change amount of the first measurement value exceeds the first threshold, or the TA timer times out and the change amount of the first measurement value exceeds the first threshold ⟋ 401

FIG. 4

Before a base station determines that a TA of a terminal is in an invalid state, the terminal receives from the base station uplink transmission configuration information; where the uplink transmission configuration information includes configuration information of an uplink channel resource and configuration information of a downlink control channel search space, where the uplink transmission configuration information is used for supporting data transmission of the terminal in a radio resource control IDLE state ⟋ 501

FIG. 5

In response to a first condition being satisfied, a terminal determines that a TA is in an invalid state; where the first condition includes at least one of the followings: in response to the terminal being a stationary terminal, a TA timer times out and a change amount of a first measurement value exceeds a first threshold; in response to the terminal being a non-stationary terminal, the TA timer times out, or the change amount of the first measurement value exceeds the first threshold, or the TA timer times out and the change amount of the first measurement value exceeds the first threshold; or the TA timer times out ⟵ 901

FIG. 9

Before a terminal determines that a TA is in an invalid state, a base station sends uplink transmission configuration information to the terminal; where the uplink transmission configuration information includes configuration information of an uplink channel resource and configuration information of a downlink control channel search space, where the uplink transmission configuration information is used for supporting data transmission of the terminal in the radio resource control IDLE state ⟵ 1001

FIG. 10

| 11 | CH 11 | CH 10 | CH 4  | CH 5  |
|----|-------|-------|-------|-------|
| 10 | CH 10 | CH 11 | CH 5  | CH 4  |
| 9  | CH 9  | CH 8  | CH 2  | CH 3  |
| 8  | CH 8  | CH 9  | CH 3  | CH 2  |
| 7  | CH 7  | CH 6  | CH 0  | CH 1  |
| 6  | CH 6  | CH 7  | CH 1  | CH 0  |
| 5  | CH 5  | CH 4  | CH 10 | CH 11 |
| 4  | CH 4  | CH 5  | CH 11 | CH 10 |
| 3  | CH 3  | CH 2  | CH 8  | CH 9  |
| 2  | CH 2  | CH 3  | CH 9  | CH 8  |
| 1  | CH 1  | CH 0  | CH 6  | CH 7  |
| 0  | CH 0  | CH 1  | CH 7  | CH 6  |
|    | Symbol Group 1 | Symbol Group 2 | Symbol Group 3 | Symbol Group 4 |

METHOD AND DEVICE FOR PROCESSING TIMING ADVANCE (TA), AND METHOD AND DEVICE FOR SENDING INDICATION INFORMATION

CROSS-REFERENCE TO RELATED APPLICATION

This is a national stage application filed under 37 U.S.C. 371 based on International Patent Application No. PCT/CN2020/073033, filed Jan. 19, 2020, which claims priority to Chinese Patent Application No. 201910056607.4 filed with the CNIPA Jan. 21, 2019, the disclosure of which are incorporated herein by reference in their entireties.

TECHNICAL FIELD

Embodiments of the present disclosure relate to, but are not limited to, the field of wireless communications and, specifically, relate to a method and a device for processing a timing advance (TA), and a method and a device for sending indication information.

BACKGROUND

With the development of intelligent terminals and the enrichment of wireless data application services, data users in the wireless communication network have greatly increased, wireless data contents are no longer limited to traditional texts or images, and more and more multimedia service contents such as high-definition videos and mobile television are emerging, resulting in an explosive growth of wireless communication network traffic. The mobile Internet and the Internet of Things will become the main driving force for the development of mobile communications.

For the Internet of Things, the 3rd Generation Partnership Project (3GPP) standards organization has developed two representative communication standards protocols: the Machine-Type Communication (MTC) and the Narrow Band Internet of Things (NB-IoT). For the mobile Internet, the 3GPP standards organization has recently developed the fifth generation (5G) New Radio (NR) communication standards protocol. According to the above-mentioned communication standards protocol, a terminal enters a radio resource control IDLE (RRC-IDLE) state when there is no data to be transmitted or received, thereby saving the power consumption of the terminal.

According to the above-mentioned communication standards protocol, the terminal needs to enter a radio resource control CONNECT (RRC-CONNECT) state from the RRC-IDLE state before sending or receiving any data. However, when the terminal enters the RRC-CONNECT state from the RRC-IDLE state, the power consumption of the terminal and system resources are consumed.

SUMMARY

An embodiment of the present disclosure provides a timing advanced (TA) processing method. The method includes the step described below.

In response to a first condition being satisfied, a TA of a terminal is in an invalid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

An embodiment of the present disclosure further provides a TA processing method. The method includes the step described below.

In response to a TA of a terminal being in an invalid state, one of the following operations is executed.

The terminal sends a random access signal used for a non-contention-based random access procedure.

The terminal sends a random access signal on a first-type resource.

The terminal sends a random access signal used for a contention-based random access procedure.

The terminal receives a signaling that triggers a non-contention-based random access procedure and is sent by a base station.

The terminal receives a signaling that triggers a contention-based random access procedure and is sent by a base station.

An embodiment of the present disclosure further provides an indication information sending method. The method includes the step described below.

A terminal sends first indication information to a base station.

The first indication information indicates at least one of the following information.

A TA of the terminal is in an invalid state.

The terminal does not receive hybrid automatic repeat request acknowledgement information (HARQ-ACK) feedback information sent by the base station for uplink data sent on a first-type resource.

The coverage enhancement level of the terminal changes.

The serving cell of the terminal changes.

The number of times the terminal needs to repeatedly send the uplink data sent on the first-type resource changes.

The service mode of the terminal corresponding to the uplink data sent on the first-type resource changes.

An embodiment of the present disclosure further provides a TA processing device. The device includes a determination unit described below.

The determination unit is configured to, in response to a first condition being satisfied, determine that a TA of a terminal is in an invalid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

An embodiment of the present disclosure further provides a TA processing device. The device is applied to a terminal and includes an execution unit described below.

The execution unit is configured to, in response to a TA of the terminal being in an invalid state, execute one of the following operations.

A random access signal used for a non-contention-based random access procedure is sent.

A random access signal on a first-type resource is sent.

The terminal sends a random access signal used for a contention-based random access procedure.

A signaling that triggers a non-contention-based random access procedure and is sent by a base station is received.

A signaling that triggers a contention-based random access procedure and is sent by a base station is received.

An embodiment of the present disclosure further provides an indication information sending device. The device is applied to a terminal and includes an indication unit described below.

The indication unit is configured to send first indication information to a base station.

The first indication information indicates at least one of the following information.

A TA of the terminal is in an invalid state.

The terminal does not receive HARQ-ACK feedback information sent by the base station for uplink data sent on a first-type resource.

The coverage enhancement level of the terminal changes.

The serving cell of the terminal changes.

The number of times the terminal needs to repeatedly send the uplink data sent on the first-type resource changes.

The service mode of the terminal corresponding to the uplink data sent on the first-type resource changes.

An embodiment of the present disclosure further provides a TA processing apparatus. The apparatus includes a memory, a processor, and a computer program stored in the memory and executable by the processor, where when the computer program is executed by the processor, the TA processing method is performed.

An embodiment of the present disclosure further provides an indication information sending apparatus. The apparatus includes a memory, a processor, and a computer program stored in the memory and executable by the processor, where when the computer program is executed by the processor, the indication information sending method is performed.

An embodiment of the present disclosure further provides a computer-readable storage medium storing an information processing program, where when the information processing program is executed by a processor, the TA processing method is performed.

An embodiment of the present disclosure further provides a computer-readable storage medium storing an information processing program, where when the information processing program is executed by a processor, the indication information sending method is performed.

Compared with the related art, the embodiments of the present disclosure provide TA processing methods and devices. In one of the methods, whether a TA is valid is determined according to a type of a terminal, that is, a user equipment (UE), thereby improving the accuracy of determining whether the TA is in an invalid or valid state. In the other of the methods, the terminal in the TA invalid state is allowed to be quickly recovered to the TA valid state so as to ensure the subsequent data sending or reception in the RRC IDLE state.

Compared with the related art, the embodiments of the present disclosure provide an indication information sending method and device that enable the base station to clearly identify the reason for the failure of sending or receiving support data in the RRC IDLE state, so that the success probability of the subsequent support data sending or reception in the RRC IDLE state is higher.

BRIEF DESCRIPTION OF DRAWINGS

FIG. 1 is a flowchart of a method for processing a TA according to an embodiment of the present disclosure;

FIG. 2 is a flowchart of a method for processing a TA according to another embodiment of the present disclosure;

FIG. 3 is a flowchart of a method for sending indication information according to an embodiment of the present disclosure;

FIG. 4 is a flowchart of a method for processing a TA according to another embodiment of the present disclosure;

FIG. 5 is a flowchart of a method for processing a TA according to another embodiment of the present disclosure;

FIG. 9 is a flowchart of a method for processing a TA according to another embodiment of the present disclosure;

FIG. 10 is a flowchart of a method for processing a TA according to another embodiment of the present disclosure;

DETAILED DESCRIPTION

Figure 6:
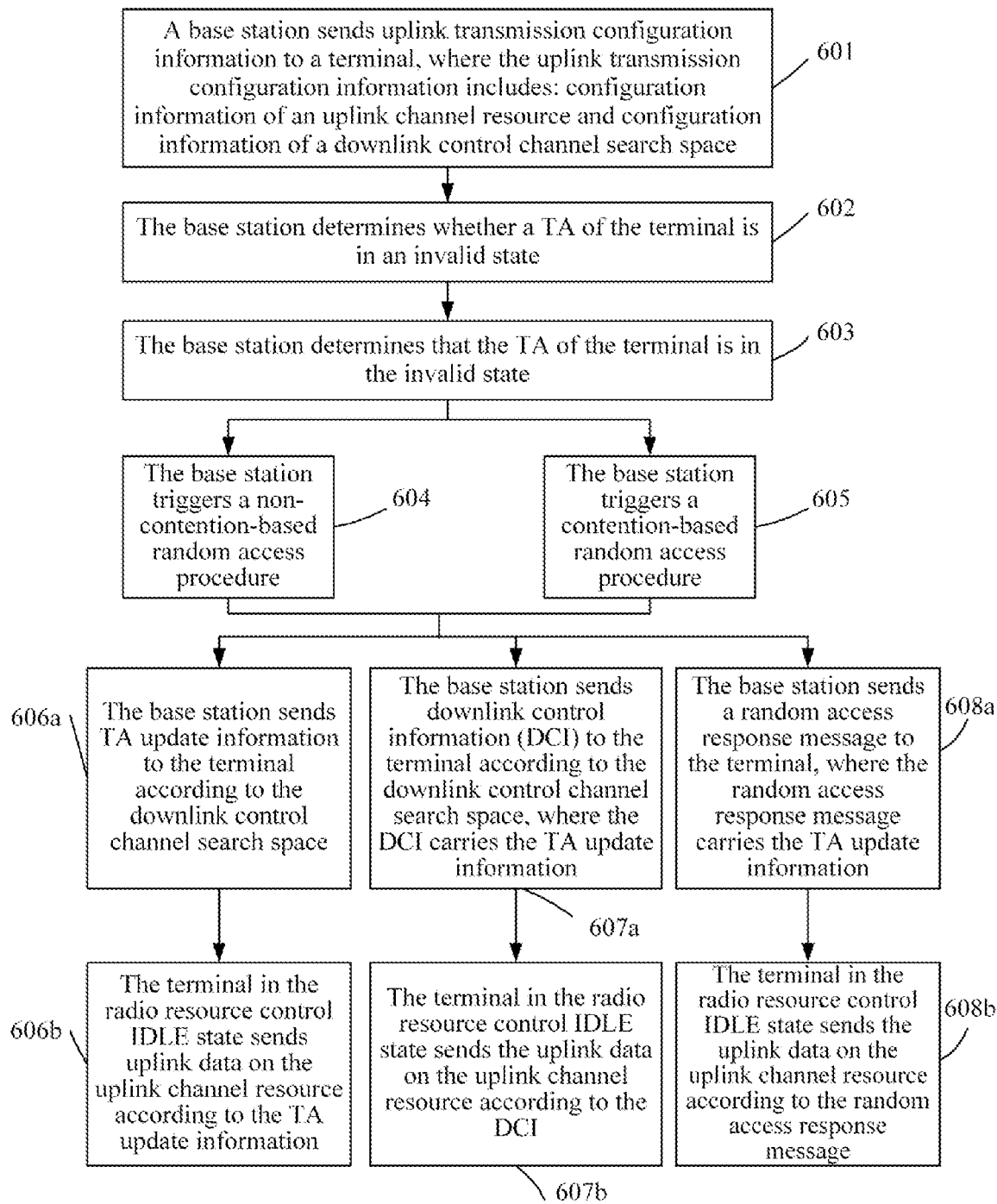
FIG. 6 is a flowchart of a method for processing a TA according to another embodiment of the present disclosure.

The embodiments of the present disclosure will be described below in detail in conjunction with the drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

According to the communication standards protocols in the related art, such as MTC protocol and NB-IoT protocol, the terminal needs to enter an RRC-CONNECT state from the RRC-IDLE state before sending or receiving any data. When the terminal enters the RRC-CONNECT state from the RRC-IDLE state, the power and system resources of the terminal are consumed. Therefore, there is a need for a new data transmission method to support the terminal to send or receive support data in the RRC-IDLE state, thereby reducing the consumption of the power and system resources of the terminal.

FIG. 1 is a flowchart of a method for processing a TA according to an embodiment of the present disclosure. As shown in FIG. 1, the method includes step 101 described below.

In step 101, in response to a first condition being satisfied, it is determined that a TA of a terminal is in an invalid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

The first measurement value includes at least one of a reference signal receiving power (RSRP), a reference signal receiving quality (RSRQ), a downlink signal-to-interference-plus-noise ratio (SINR), a downlink signal-to-noise ratio (SNR), an uplink SINR, an uplink SNR, a downlink path loss, or an uplink path loss.

The first measurement value is measured based on a first reference signal, and the first reference signal includes at least one of: a synchronization signal block (SSB), a channel state information-reference signal (CSI-RS), a cell-specific reference signal (CRS), a UE-specific demodulation reference signal (DMRS), or a phase-tracking reference signal (PTRS).

The number corresponding to the first reference signal is the number corresponding to an SSB in which configuration information of a random access channel used by the terminal for sending a random access signal is located.

In the technical solution provided by the above-mentioned embodiment, the independent determination of TA invalid/valid state is adopted according to the type of the terminal (which is also referred to as UE), thereby improving the accuracy of determination of the TA invalid/valid state. Further, the TA of the terminal is ensured to be in the valid state all the time, thus ensuring the success rate of the subsequent data sending or reception in the RRC IDLE state.

FIG. 2 is a flowchart of a method for processing a TA according to another embodiment of the present disclosure. As shown in FIG. 2, the method includes step 201 described below.

In step 201, in response to a TA of a terminal being in an invalid state, one of the following operations is executed.

The terminal sends a random access signal used for a non-contention-based random access procedure.

The terminal sends a random access signal on a first-type resource.

The terminal sends a random access signal used for a contention-based random access procedure.

The terminal receives from a base station signaling that triggers a non-contention-based random access procedure.

The terminal receives from the base station signaling that triggers a contention-based random access procedure.

In response to a presence of a random access resource before a time T2 or an absence of the random access resource within a time period from T2 minus T3 to T2 before a next first-type resource, the terminal sends the random access signal used for the contention-based random access procedure on the random access resource.

T2 is equal to the start time of the next first-type resource minus T1, and values of T1, T2, and T3 are configured by the base station or are each a default configuration value.

In response to a second condition being satisfied, the terminal sends the random access signal on the first-type resource.

The second condition includes at least one of the following conditions.

No random access resource is present before the time T2.

No random access resource is present within the time period from T2 minus T3 to T2 before the next first-type resource.

The frequency domain bandwidth of the first-type resource is greater than or equal to a second threshold value;

The time domain length of the first-type resource is greater than or equal to the time domain length of the random access signal.

P1+10*log 10(R1/R2) is less than or equal to P2.

In P1+10*log 10(R1/R2), P1 is a transit power of the terminal for sending a random access signal at a current coverage enhancement level, P2 is a maximum transmit power of the terminal or a power threshold configured by the base station, R1 is the number of repeatedly sending by the terminal a random access signal at the current coverage enhancement level, and R2 is the number of repeatedly sending by the terminal a random access signal on the first-type resource. T2 is equal to the start time of the next first-type resource minus T1, and values of T1, T2, and T3 are configured by the base station or are each a default configuration value.

When the terminal sends the random access signal used for the non-contention-based random access procedure, a random access channel for sending the random access signal is a random access channel after a TA timer reset time plus a time T1.

The value of T1 is configured by the base station or is a default configuration value.

In response to a third condition being satisfied, the terminal receives from the base station the signaling that triggers the non-contention-based random access procedure; or the terminal receives from the base station the signaling that triggers the contention-based random access procedure.

The third condition includes at least one of the following conditions.

No random access resource is present before the time T2 and a fourth condition is not satisfied.

No random access resource is present within the time period from T2 minus T3 to T2 before the next first-type resource and the fourth condition is not satisfied.

The fourth condition includes at least one of the following conditions.

The frequency domain bandwidth of the first-type resource is greater than or equal to the second threshold value.

The time domain length of the first-type resource is greater than or equal to the time domain length of the random access signal.

P1+10*log 10(R1/R2) is less than or equal to P2.

In P1+10*log 10(R1/R2), P1 is a transit power of the terminal for sending a random access signal at a current coverage enhancement level, P2 is a maximum transmit power of the terminal or a power threshold configured by the base station, R1 is the number of repeatedly sending by the terminal a random access signal at the current coverage enhancement level, and R2 is the number of repeatedly sending by the terminal a random access signal on the first-type resource. T2 is equal to the start time of the next first-type resource minus T1, and values of T1, T2, and T3 are configured by the base station or are each a default configuration value.

Whether the TA is in the invalid state is determined through a TA timer.

Whether the TA is in the invalid state is determined according to whether a fifth condition is satisfied.

The fifth condition includes: a change amount of a first measurement value exceeds a first threshold.

The first measurement value includes at least one of an RSRP, an RSRQ, a downlink SINR, a downlink SNR, an uplink SINR, an uplink SNR, a downlink path loss, or an uplink path loss.

The first measurement value is measured based on a first reference signal.

The first reference signal includes at least one of an SSB, a CSI-RS, a CRS, a UE-specific DMRS, or a PTRS.

The number corresponding to the first reference signal is the number corresponding to an SSB in which configuration information of a random access channel used by the terminal for sending a random access signal is located.

In the technical solution provided by the abovementioned embodiment, in one aspect, the terminal can be quickly recovered from the TA invalid state to the TA valid state so as to ensure the subsequent data sending or reception in the RRC-IDLE state, and in another aspect, the UE can quickly enter the RRC-CONNECT state so as to continue the data sending or reception.

FIG. 3 is a flowchart of a method for sending indication information according to an embodiment of the present disclosure. As shown in FIG. 3, the method includes step 301 described below.

In step 301, a terminal sends first indication information to a base station.

The first indication information indicates at least one of the following information.

A TA of the terminal is in an invalid state.

The terminal fails to receive from the base station HARQ-ACK feedback information for uplink data sent on a first-type resource.

The coverage enhancement level of the terminal changes.

The serving cell of the terminal changes.

The number of repeatedly sending by the terminal the uplink data sent on the first-type resource changes.

The service mode of the terminal corresponding to the uplink data sent on the first-type resource changes.

The service mode changing includes at least one of the following cases.

A transport block size (TBS) corresponding to the uplink data sent on the first-type resource changes.

A transmission period corresponding to the uplink data sent on the first-type resource changes.

In the technical solution provided by the abovementioned embodiment, the base station can clearly identify the reason for the failure of data sending or reception supported in the RRC-IDLE state, so that the success probability of the subsequent data sending or reception supported in the RRC-IDLE state is higher.

In another embodiment of the present disclosure, it is needed to be determined whether the current serving cell or camping cell of the terminal changes before determining whether the TA of the terminal is in the invalid state based on the first condition. If the current serving cell or camping cell changes, the first condition need not be satisfied, and the TA of the terminal is also in the invalid state. If the current serving cell or camping cell does not change, whether the TA of the terminal is in the invalid state is determined according to the first condition.

In another embodiment of the present disclosure, whether the TA of the terminal is in the invalid state is determined based on the TA timer. For example, when the TA timer times out, it is determined that the TA is in the invalid state; and when the TA timer does not time out, it is determined that the TA is in the valid state.

In another embodiment of the present disclosure, whether the TA is in the invalid state is determined according to whether a fifth condition is satisfied, where the fifth condition includes: a change amount of a first measurement value exceeds a first threshold. For example, when the fifth condition is satisfied, it is determined that the TA is in the invalid state; when the fifth condition is not satisfied, it is determined that the TA is in the valid state.

In another embodiment of the present disclosure, the first measurement value is measured based on a first reference signal. The first reference signal includes at least one of: an SSB, a CSI-RS, a CRS, a UE-specific DMRS, or a PTRS. The SSB (that is, an SS/PBCH block) consists of a primary synchronization signal (PSS), a secondary synchronization signal (SSS), and a physical broadcast channel (PBCH). The base station would configure one or more SSBs. Each SSB corresponds to a different number, and the sending mode of each SSB is independently configured. The sending mode of the SSB includes at least one of: applying a baseband precoding matrix onto a baseband signal to be sent by the SSB; applying a radio frequency precoding matrix onto a radio frequency signal to be sent by the SSB; configuring a transmit antenna port for sending signals; configuring a transmit beam and/or a transmit beam direction for sending signals; or configuring a transmit power for sending signals. The CSI-RS is used for measuring the state information of a channel. The base station would configure one or more CSI-RSs. Each CSI-RS corresponds to a different number, and the sending mode of each CSI-RS is independently configured. The sending mode of the CSI-RS includes at least one of: applying a baseband precoding matrix onto a baseband signal to be sent by the CSI-RS; applying a radio frequency precoding matrix onto a radio frequency signal to be sent by the CSI-RS; configuring a transmit antenna port for sending signals; configuring a transmit beam and/or a transmit beam direction for sending signals; or configuring a transmit power for sending signals. Optionally, the number corresponding to the first reference signal is the number corresponding to an SSB in which configuration information of a random access channel used by the terminal for sending a random access signal is located.

In another embodiment of the present disclosure, when the TA of the terminal is in the invalid state, the terminal sends the random access signal on the first-type resource.

In another embodiment of the present disclosure, in response to a second condition being satisfied, the terminal sends the random access signal on the first-type resource. Specifically, the second condition includes at least one of: no random access resource is present before the time T2; no random access resource is present within the time period from T2 minus T3 to T2 before the next first-type resource; a frequency domain bandwidth of the first-type resource is greater than or equal to a second threshold value; a time domain length of the first-type resource is greater than or equal to a time domain length of the random access signal; or $P1+10*\log 10(R1/R2)$ is less than or equal to P2, where P1 is a transit power of the terminal for sending a preamble at a current coverage enhancement level, P2 is a maximum transmit power of the terminal or a power threshold configured by the base station, R1 is the number of times repeatedly sending by the terminal a preamble at the current coverage enhancement level, and R2 is the number of repeatedly sending by the terminal a preamble on the first-type resource.

In another embodiment of the present disclosure, optionally, the first-type resource may be a resource that is configured by the base station for the terminal and is used for the terminal to transmit uplink data when the terminal is in the RRC-IDLE state. The first-type resources are periodically distributed or discrete in the time domain. In addition, the base station would also configure downlink control channel search spaces for the terminal. One of the downlink control channel search spaces corresponds to at least one of the first-type resources. The information carried on the downlink control channel includes downlink control information (DCI). The configuration information of the first-type resource may be understood as information used for sending uplink data when the random access signal is sent, and may also be understood as configuration information of a resource corresponding to a random access signal carrying uplink data in the 5G NR system. Specifically, the configuration information of the first-type resource also includes configuration information of the physical random access channel (PRACH). The configuration information of the PRACH includes at least one of: configuration information of a time-frequency resource occupied by the PRACH or configuration information of a random access signal sent on the PRACH. For the uplink channel of the NB-IoT system, the frequency domain bandwidth of the first-type resource is optionally greater than or equal to 3 subcarriers, where the subcarrier spacing is 15 KHz. Optionally, the frequency domain bandwidth of the first-type resource is 3, 6 or 12 subcarriers. If the data sent on the first-type resource supports repetitive transmission, the time domain length of the first-type resource includes the time domain length occupied during the repetitive transmission.

In another embodiment of the present disclosure, the above-mentioned HARQ-ACK information includes an acknowledgement (ACK) or a negative acknowledgement (NACK). ACK represents that corresponding data is correctly received, and NACK represents that the corresponding data is not correctly received.

In another embodiment of the present disclosure, the above-mentioned first indication information may also be referred to as backoff cause indication information or release cause indication information. The backoff refers to a backoff from a transmission mode in which data is sent on the first-type resource. For example, the random access procedure may be backed off to, or the RRC-IDLE state may be backed off to. The release refers to a release of the first-type resource and/or a release of the resource of the downlink control channel search space.

FIG. 4 is a flowchart of a method for processing a TA according to another embodiment of the present disclosure. As shown in FIG. 4, the method includes step 401 described below.

In step 401, in response to a first condition being satisfied, a base station determines that a TA of a terminal is in an invalid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

The first measurement value includes at least one of an RSRQ, a downlink SINR, a downlink SNR, an uplink SINR, an uplink SNR, a downlink path loss, or an uplink path loss.

The first measurement value is a measurement value on one beam direction.

Before the base station determines that the TA of the terminal is in the invalid state, the method further includes the steps described below.

It is determined whether a current serving cell or camping cell of the terminal changes.

If the current serving cell or camping cell changes, it is determined that the TA of the terminal is in the invalid state.

If the serving cell or camping cell does not change, the base station determines whether the first condition is satisfied.

When the base station determines that the TA of the terminal is in the invalid state, the method further includes the step described below.

One of the following operations is executed: the base station triggers a non-contention-based random access procedure, or the base station triggers a contention-based random access procedure.

Before the base station determines that the TA of the terminal is in the invalid state, the method further includes the step described below.

The base station sends uplink transmission configuration information to the terminal.

The uplink transmission configuration information includes configuration information of an uplink channel resource and configuration information of a downlink control channel search space. The uplink transmission configuration information is used for supporting data transmission of the terminal in the RRC-IDLE state.

The uplink transmission configuration information further includes an index of a non-contention-based random access channel or an index of a non-contention-based random access sequence, which is configured for the terminal.

After the base station triggers the non-contention-based random access procedure or triggers the contention-based random access procedure, the method further includes one of the steps described below.

The base station sends TA update information to the terminal according to the downlink control channel search space; or the base station sends a DCI to the terminal according to the downlink control channel search space, where the DCI carries the TA update information; or the base station sends a random access response message to the terminal, where the random access response message carries the TA update information.

FIG. 5 is a flowchart of a method for processing a TA according to another embodiment of the present disclosure. As shown in FIG. 5, the method includes step 501 described below.

In step 501, before the base station determines that the TA of the terminal is in the invalid state, the terminal receives from the base station uplink transmission configuration information.

The uplink transmission configuration information includes configuration information of an uplink channel resource and configuration information of a downlink control channel search space. The uplink transmission configuration information is used for supporting data transmission of the terminal in the RRC-IDLE state.

The uplink transmission configuration information further includes an index of a non-contention-based random access channel or an index of a non-contention-based random access sequence, which is configured for the terminal.

After the base station triggers the non-contention-based random access procedure or triggers the contention-based random access procedure, the method further includes the steps described below.

The terminal receives from the base station TA update information according to the downlink control channel search space, and the terminal sends uplink data on the uplink channel resource according to the update information in an RRC-IDLE state.

Alternatively, the terminal receives from the base station a DCI according to the downlink control channel search space, where the DCI carries the TA update information, and the terminal sends the uplink data on the uplink channel resource according to the DCI in an RRC-IDLE state.

Alternatively, the terminal receives from the base station a random access response message, where the random access response message carries the TA update information, and the terminal sends the uplink data on the uplink channel resource in an RRC-IDLE state according to the random access response message.

FIG. 6 is a flowchart of a method for processing a TA according to another embodiment of the present disclosure. As shown in FIG. 6, the method includes steps 601, 602, 603, 604, 605, 606a, 606b, 607a, 607b, 608a, and 608b described below.

In step 601, a base station sends uplink transmission configuration information to a terminal, where the uplink transmission configuration information includes configuration information of an uplink channel resource and configuration information of a downlink control channel search space.

In this embodiment, the uplink transmission configuration information is used for supporting data transmission of the UE in the RRC-IDLE state.

Figure 7:
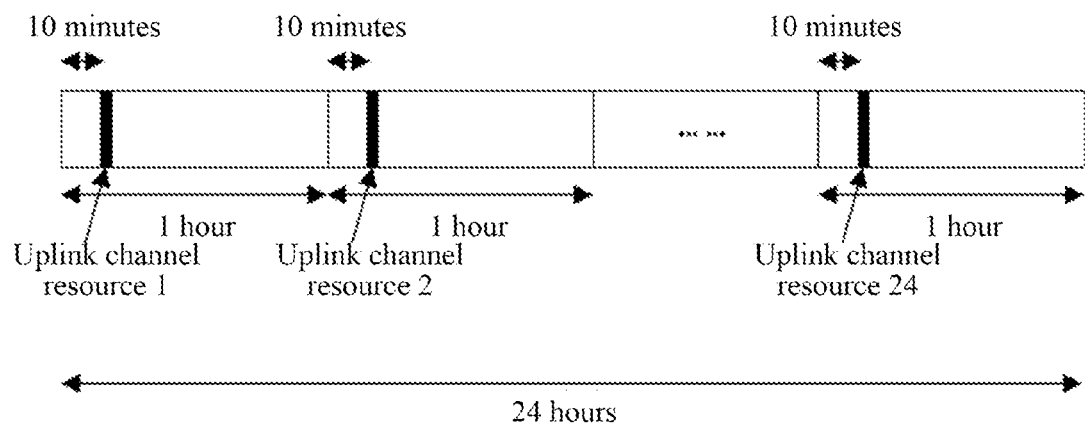
FIG. 7 is a schematic diagram of the configuration of uplink channel resources according to an embodiment of the present disclosure.
Figure 8:
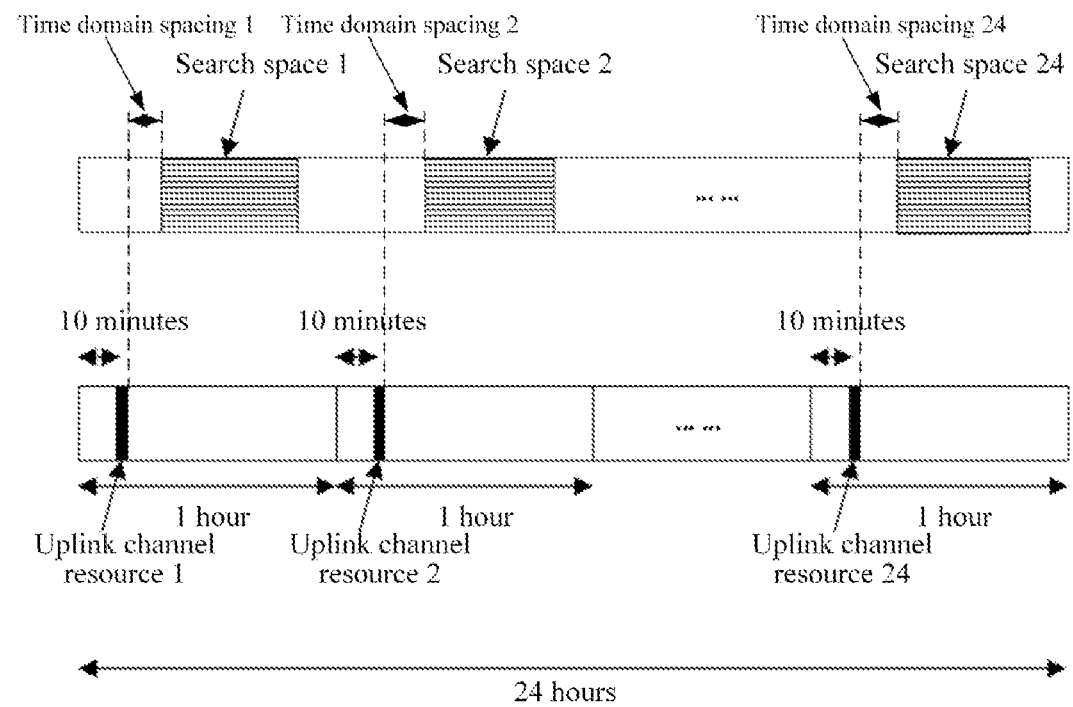
FIG. 8 is a schematic diagram of the configuration of uplink channel resources and search spaces according to an embodiment of the present disclosure.

Specifically, the configuration information of the uplink channel resource indicates the location information of a group of uplink channel resources. As shown in FIG. 7, the configuration period of the uplink channel resources is 1 hour, and the paranoid amount of the time domain location of the uplink channel resources in the configuration period is 10 minutes. FIG. 7 is a schematic diagram showing the locations of 24 uplink channel resources within 24 hours, where the 24 uplink channel resources are numbered from "uplink channel resource 1" to "uplink channel resource 24", respectively. The configuration information of the downlink control channel search space is a terminal-specific downlink control channel search space including at least one downlink control channel transmit resource set (also referred to as a transmit opportunity). The DCI is carried on a downlink control channel for transmission. Each uplink channel resource corresponds to one downlink control channel search space. As shown in FIG. 8, the downlink control channel search space corresponding to the uplink channel resource whose index is 1 is search space 1, and there is a time domain spacing between the start time of search space 1 and the end time of uplink channel resource 1, which is defined as time domain spacing 1. In this way, the downlink control channel search space corresponding to the uplink channel resource whose index is 24 is search space 24, and there is a time domain spacing between the start time of search space 24 and the end time of uplink channel resource 24, which is defined as time domain spacing 24.

The base station also configures an index of a non-contention-based random access channel or an index of a non-contention-based random access sequence for the terminal while sending the uplink transmission configuration information to the terminal. The channel used for sending the non-contention-based random access sequence is a random access channel after the time T0+T1, where T0 is a reset time of a TA timer, T1 is configured by the base station and is used for indicating a TA validity period length.

In step 602, the base station determines whether the TA of the terminal is in an invalid state.

The terminal is in a radio resource control IDLE (RRC-IDLE) state.

The base station determines whether the TA of the terminal is in the invalid state according to at least one of the following bases.

1. The base station determines whether the current serving cell or camping cell of the terminal changes. If the current serving cell or camping cell changes, it is determined that the TA of the terminal is in the invalid state. If the current serving cell or camping cell does not change, the base station determines whether a first condition is satisfied.
2. The base station determines whether the first condition is satisfied. When the first condition is satisfied, the base station determines that the TA of the terminal is in the invalid state. When the first condition is not satisfied, the base station determines that the TA of the terminal is in the valid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

Optionally, it is needed to be determined whether the current serving cell or camping cell of the terminal changes before determining whether the TA of the terminal is in the invalid state based on the first condition. If the current serving cell or camping cell changes, the first condition need not be satisfied, and the TA of the terminal is also in the invalid state. If the current serving cell or camping cell does not change, whether the TA of the terminal is in the invalid state is determined according to the first condition.

The first measurement value includes at least one of an RSRQ, a downlink SINR, a downlink SNR, an uplink SINR, an uplink SNR, a downlink path loss, or an uplink path loss.

The first measurement value is a measurement value on one beam direction.

In step 603, when determining that the TA of the terminal is in the invalid state, the base station executes step 604 or step 605.

In step 604, the base station triggers a non-contention-based random access procedure.

Optionally, the non-contention-based random access procedure may be triggered through a PDCCH Order. The PDCCH Order is a transmit format of a DCI and is used for triggering a random access procedure. The PDCCH order includes index information of a random access channel or index information of a random access signal.

In step 605, the base station triggers a contention-based random access procedure.

In step 606a, the base station sends TA update information to the terminal according to the downlink control channel search space.

Specifically, in this embodiment, if the base station sends the TA update information in the search space 1 shown in FIG. 8, the TA timer is reset, and thus, the time of sending the TA update information in the search space 1 is T0.

In step 606b, the terminal in the RRC-IDLE state sends uplink data on the uplink channel resource according to the TA update information.

In step 607a, the base station sends a DCI to the terminal according to the downlink control channel search space, where the DCI carries the TA update information.

In step 607b, the terminal in the RRC-IDLE state sends the uplink data on the uplink channel resource according to the DCI.

In step 608a, the base station sends a random access response message to the terminal, where the random access response message carries the TA update information.

The base station may send the random access response message to the terminal after receiving the random access sequence preamble, where the random access sequence Preamble is sent by the terminal on the random access channel.

Specifically, in this embodiment, if there is no new TA update information within the time period from T0 to T0+T1, when the time exceeds T0+T1, the terminal needs to send the non-contention-based random access sequence on the random access channel to allow the base station to measure the TA value and send the updated TA information to the terminal through the random access response message.

In step 608b, the terminal in the RRC-IDLE state sends the uplink data on the uplink channel resource according to the random access response message.

The above-mentioned step 606a, 607a, and 608a are in a coordinating relation.

FIG. 9 is a flowchart of a method for processing a TA according to another embodiment of the present disclosure. As shown in FIG. 9, the method includes step 901 described below.

In step 901, in response to a first condition being satisfied, a terminal determines that a TA is in an invalid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

The TA timer times out.

The first measurement value includes at least one of an RSRP, an RSRQ, a downlink SINR, a downlink SNR, an uplink SINR, an uplink SNR, a downlink path loss, or an uplink path loss.

The first measurement value is a measurement value on one beam direction.

Before the terminal determines that the TA is in the invalid state, the method further includes the steps described below.

It is determined whether a current serving cell or camping cell of the terminal changes.

If the current serving cell or camping cell changes, the TA of the terminal is in the invalid state when the first condition is not satisfied.

If the current serving cell or camping cell does not change, the terminal determines whether the first condition is satisfied.

When the terminal determines that the TA is in the invalid state, the method further includes the step described below.

One of the following operations is executed: the terminal sends a random access signal used for a non-contention-based random access procedure, or the terminal sends a random access signal on a first-type resource, or the terminal triggers a contention-based random access procedure.

In response to a presence of a random access resource before a time T2 or an absence of the random access resource within a time period from T2 minus T3 to T2 before a next first-type resource, the terminal triggers the contention-based random access procedure on the random access resource.

T2 is equal to the start time of the next first-type resource minus T1, and values of T1, T2, and T3 are configured by the base station or are each a default configuration value.

In response to a second condition being satisfied, the terminal sends the random access signal on the first-type resource.

The second condition includes at least one of the following conditions.

No random access resource is present before the time T2, where T2 is equal to the start time of the next first-type resource minus T1, and values of T1 and T2 are configured by the base station or are each a default configuration value.

No random access resource is present within the time period from T2 minus T3 to T2 before the next first-type resource, where T3 is configured by the base station or is a default configuration value.

The frequency domain bandwidth of the first-type resource is greater than or equal to a second threshold value.

The time domain length of the first-type resource is greater than or equal to the time domain length of a random access sequence preamble.

P1+10*log 10(R1/R2) is less than or equal to P2, where P1 is a transit power of the terminal for sending a preamble at the current coverage enhancement level, P2 is a maximum transmit power of the terminal or a power threshold configured by the base station, R1 is the number of repeatedly sending by the terminal the preamble at the current coverage enhancement level, and R2 is the number of repeatedly sending by the terminal the preamble on the first-type resource.

In response to a third condition being satisfied, the terminal receives from the base station signaling that triggers the non-contention-based random access procedure or the terminal receives from the base station signaling that triggers the contention-based random access procedure.

The third condition includes at least one of the following conditions.

No random access resource is present before the time T2 and a fourth condition is not satisfied.

No random access resource is present within the time period from T2 minus T3 to T2 before the next first-type resource and the fourth condition is not satisfied.

The fourth condition includes at least one of the following conditions.

The frequency domain bandwidth of the first-type resource is greater than or equal to the second threshold value.

The time domain length of the first-type resource is greater than or equal to the time domain length of the random access signal.

P1+10*log 10(R1/R2) is less than or equal to P2.

In P1+10*log 10(R1/R2), P1 is a transit power of the terminal for sending a random access signal at the current coverage enhancement level, P2 is a maximum transmit power of the terminal or a power threshold configured by the base station, R1 is the number of repeatedly sending by the terminal a random access signal at the current coverage enhancement level, and R2 is the number of repeatedly sending by the terminal a random access signal on the first-type resource. T2 is equal to the start time of the next first-type resource minus T1, and values of T1, T2, and T3 are configured by the base station or are each a default configuration value.

The values of T2 and T3 are configured by the base station or are each a default configuration value.

When the terminal sends the random access signal used for the non-contention-based random access procedure, a random access channel for sending the random access preamble is a random access channel after a TA timer reset time plus the time T1.

The value of T1 is configured by the base station or is a default configuration value.

The first condition at least includes whether the change amount of the first measurement value exceeds the first threshold.

One downlink control channel search space corresponds to at least one first-type resource, where the first-type resource is configured by the base station for the terminal and is used for the terminal in the RRC-IDLE state for transmitting a resource of the uplink data.

The frequency domain bandwidth of the first resource is greater than or equal to 3 subcarriers, where the subcarrier spacing is 15 kHz.

If the data sent on the first-type resource supports repetitive transmission, the time domain length of the first-type resource includes the time domain length occupied during the repetitive transmission.

Before the terminal determines that the TA is in the invalid state, the method further includes the step described below.

Uplink transmission configuration sent by the base station is received.

The uplink transmission configuration information includes configuration information of an uplink channel resource and configuration information of a downlink control channel search space. The uplink transmission configuration information is used for supporting data transmission of the terminal in the RRC-IDLE state.

The uplink transmission configuration information further includes an index of a non-contention-based random access channel or an index of a non-contention-based random access sequence, which is configured for the terminal.

After the terminal sends the random access signal used for the non-contention-based random access procedure or the terminal sends the random access signal on the first-type resource or the terminal triggers the contention-based random access procedure, the method further includes the steps described below.

TA update information sent by the base station is received according to the downlink control channel search space; and the terminal in the RRC-IDLE state sends uplink data on the uplink channel resource according to the TA update information.

Alternatively, a DCI sent by the base station is received according to the downlink control channel search space, where the DCI carries the TA update information; and the terminal in the RRC-IDLE state sends the uplink data on the uplink channel resource according to the DCI.

Alternatively, a random access response message sent by the base station is received, where the random access response message carries the TA update information; and the terminal in the RRC-IDLE state sends the uplink data on the uplink channel resource according to the random access response message.

FIG. 10 is a flowchart of a method for processing a TA according to another embodiment of the present disclosure. As shown in FIG. 10, the method includes step 1001 described below.

In step 1001, before a terminal determines that a TA is in an invalid state, a base station sends uplink transmission configuration information to the terminal.

The uplink transmission configuration information includes configuration information of an uplink channel resource and configuration information of a downlink control channel search space. The uplink transmission configuration information is used for supporting data transmission of the terminal in the RRC-IDLE state.

The uplink transmission configuration information further includes an index of a non-contention-based random access channel or an index of a non-contention-based random access sequence, which is configured for the terminal.

After the terminal sends the random access signal used for the non-contention-based random access procedure or the terminal sends the random access signal on the first-type resource or the terminal triggers the contention-based random access procedure, the method further includes one of the steps described below.

TA update information is sent to the terminal according to the downlink control channel search space; or a DCI is sent to the terminal according to the downlink control channel search space, where the DCI carries the TA update information; or a random access response message is sent to the terminal, where the random access response message carries the TA update information.

Figure 11:
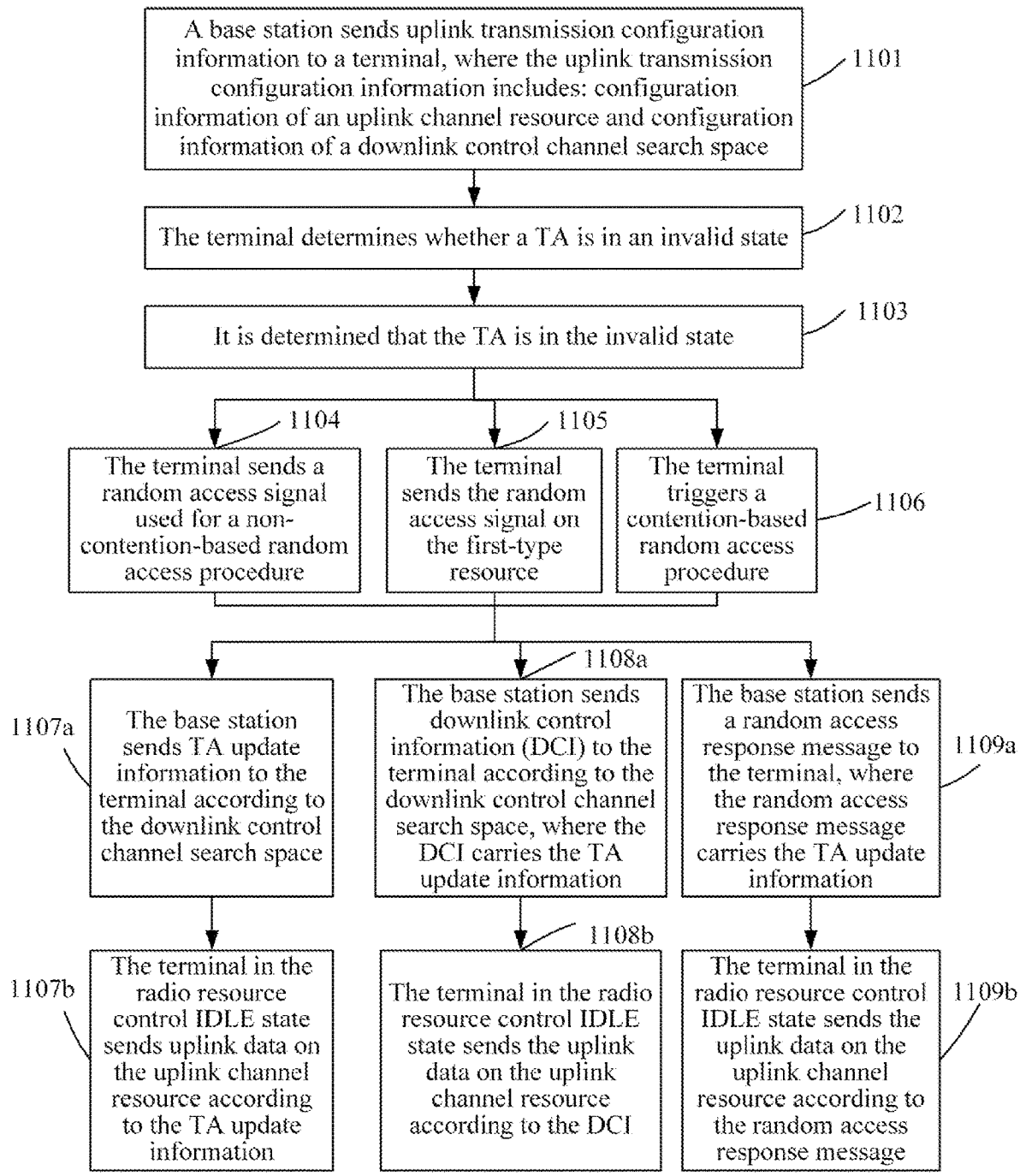
FIG. 11 is a flowchart of a method for processing a TA according to another embodiment of the present disclosure.

FIG. 11 is a flowchart of a method for processing a TA according to another embodiment of the present disclosure. As shown in FIG. 11, the method includes steps 1101, 1102, 1103, 1104, 1105, 1006, 1007a, 1107b, 1108a, 1108b, 1109a, and 1109b described below.

In step 1101, a base station sends uplink transmission configuration information to a terminal, where the uplink transmission configuration information includes: configuration information of an uplink channel resource and configuration information of a downlink control channel search space.

In this embodiment, the uplink transmission configuration information is used for supporting data transmission of the UE in the RRC-IDLE state.

Specifically, the configuration information of the uplink channel resource indicates the location information of a group of uplink channel resources. As shown in FIG. 7, the configuration period of the uplink channel resources is 1 hour, and the paranoid amount of the time domain location of the uplink channel resources in the configuration period is 10 minutes. FIG. 7 is a schematic diagram showing the locations of 24 uplink channel resources within 24 hours, where the 24 uplink channel resources are numbered from "uplink channel resource 1" to "uplink channel resource 24", respectively. The configuration information of the downlink control channel search space is a terminal-specific downlink control channel search space including at least one downlink control channel transmit resource set (also referred to as a transmit opportunity). The DCI is carried on a downlink control channel for transmission. Each uplink channel resource corresponds to one downlink control channel search space. As shown in FIG. 8, the downlink control channel search space corresponding to the uplink channel resource whose index is 1 is search space 1, and there is a time domain spacing between the start time of search space 1 and the end time of uplink channel resource 1, which is defined as time domain spacing 1. In this way, the downlink control channel search space corresponding to the uplink channel resource whose index is 24 is search space 24, and there is a time domain spacing between the start time of search space 24 and the end time of uplink channel resource 24, which is defined as time domain spacing 24.

In step 1102, the terminal determines whether a TA is in an invalid state.

The terminal is in a radio resource control IDLE (RRC-IDLE) state.

The terminal determines whether the TA is in the invalid state according to at least one of the following bases.
1. The terminal determines whether a current serving cell or camping cell of the terminal changes. If the current serving cell or camping cell changes, it is determined that the TA is in the invalid state. If the current serving cell or camping cell does not change, it is determined whether a first condition is satisfied.
2. it is determined whether the first condition is satisfied. When the first condition is satisfied, it is determined that the TA is in the invalid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

The TA timer times out.

Optionally, it is needed to be determined whether the current serving cell or camping cell of the terminal changes before determining whether the TA of the terminal is in the invalid state based on the first condition. If the current serving cell or camping cell changes, the first condition need not be satisfied, and the TA of the terminal is also in the invalid state. If the current serving cell or camping cell does not change, whether the TA of the terminal is in the invalid state is determined according to the first condition.

Optionally, the first condition at least includes whether the change amount of the first measurement value exceeds the threshold.

The first measurement value includes at least one of an RSRP, an RSRQ, a downlink SINR, a downlink SNR, an uplink SINR, an uplink SNR, a downlink path loss, or an uplink path loss.

The first measurement value is a measurement value on one beam direction.

In step 1103, when it is determined that the TA is in the invalid state, step 1104, 1105 or 1106 is executed.

Optionally, when the second condition is satisfied, the step 1105 is executed, where the second condition includes at least one of the following conditions.
1. No random access resource is present before the time T2 (T2 is equal to the start time of the next first-type resource minus T1).
2. No random access resource is present within the time period from T2 minus T3 to T2 before the next first-type resource.
3. The frequency domain bandwidth of the first-type resource is greater than or equal to the second threshold value, where the second threshold value is configured by the base station or is a default value.
4. The time domain length of the first-type resource is greater than or equal to the time domain length of a preamble.
5. P1+10*log 10(R1/R2) is less than or equal to P2, where P1 is a transit power of the terminal for sending the preamble at the current coverage enhancement level, P2 is a maximum transmit power of the terminal or a power threshold configured by the base station, R1 is the number of repeatedly sending by the terminal the preamble at the current coverage enhancement level, and R2 is the number of repeatedly sending by the terminal the preamble on the first-type resource.

In response to a third condition being satisfied, the terminal receives from the base station signaling that triggers the non-contention-based random access procedure or the terminal receives from the base station signaling that triggers the contention-based random access procedure.

The third condition includes at least one of the following conditions.

No random access resource is present before the time T2 and a fourth condition is not satisfied.

No random access resource is present within the time period from T2 minus T3 to T2 before the next first-type resource and the fourth condition is not satisfied.

The fourth condition includes at least one of the following conditions.

The frequency domain bandwidth of the first-type resource is greater than or equal to the second threshold value.

The time domain length of the first-type resource is greater than or equal to the time domain length of the random access signal.

P1+10*log 10(R1/R2) is less than or equal to P2.

In P1+10*log 10(R1/R2), P1 is a transit power of the terminal for sending a random access signal at the current coverage enhancement level, P2 is a maximum transmit power of the terminal or a power threshold configured by the base station, R1 is the number of repeatedly sending by the terminal a random access signal at the current coverage enhancement level, and R2 is the number of repeatedly sending by the terminal a random access signal on the first-type resource. T2 is equal to the start time of the next first-type resource minus T1, and values of T1, T2, and T3 are configured by the base station or are each a default configuration value.

Optionally, in response to a presence of a random access resource before the time T2 (T2 is equal to the start time of the next first-type resource minus T1) or an absence of the random access resource within a time period from T2 minus T3 to T2 before the next first-type resource, the terminal executes step 1106 on the random access resource. The values of T1 and T2 are configured by the base station or are each a default configuration value.

The time window corresponding to the random access resource is the time period from T2 minus T3 to T2, where T3 is configured by the base station or is a default configuration value.

Optionally, T1 is a time period reserved for considering the duration of the contention-based random access procedure triggered by the terminal, and T3 is a parameter configured to prevent the contention-based random access procedure triggered by the terminal from ending too early to cause the TA of the terminal to fail again at the start time of the next first-type resource.

In step 1104, the terminal sends a random access signal used for a non-contention-based random access procedure.

Optionally, the configuration information of the random access signal, together with the configuration information of the first-type resource, is sent by the base station to the terminal.

The random access signal is a physical random access channel preamble (PRACH Preamble, also referred to as Msg1).

When step 1104 is executed, the random access channel for sending the preamble is a random access channel after TA timer reset time plus the time T1.

The value of T1 is configured by the base station or is a default configuration value.

In step 1105, the terminal sends the random access signal on the first-type resource.

For the uplink channel of the NB-IoT system, optionally, the frequency domain bandwidth of the first resource is greater than or equal to 3 subcarriers, where the subcarrier spacing is 15 KHz. Optionally, the frequency domain bandwidth of the first resource is 3, 6 or 12 subcarriers.

If the data sent on the first-type resource supports repetitive transmission, the time domain length of the first-type resource herein includes the time domain length occupied during the repetitive transmission.

In step 1106, the terminal triggers a contention-based random access procedure.

Figures 12, 13:
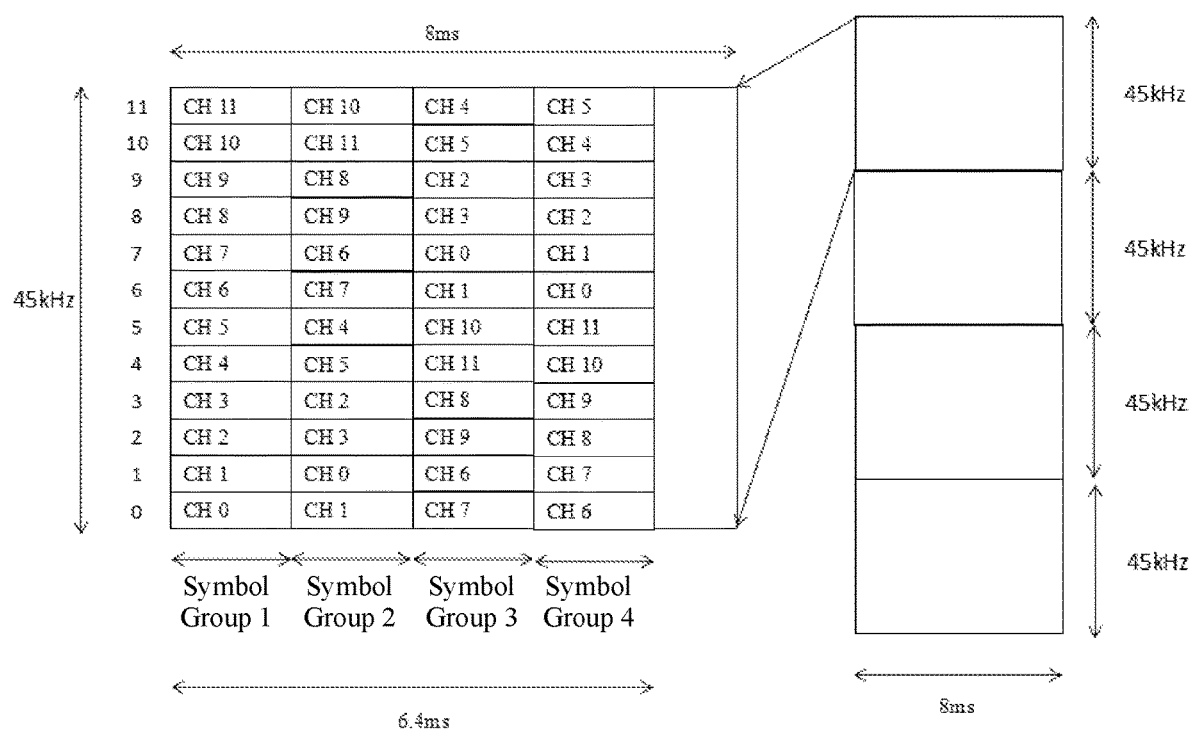
FIG. 12 is a schematic diagram of the configuration of random access resources of random access signals according to an embodiment of the present disclosure.
FIG. 13 is a schematic diagram of the distribution of resources used among uplink channel resources according to an embodiment of the present disclosure.

Specifically, in this embodiment, as shown in FIG. 8, when the TA is in the invalid state, the terminal sends the random access signal on the uplink channel resource to allow the base station to measure the TA value. In this embodiment, the wireless communication system is an NB-IoT system, the time domain length of the random access signal is 6.4 ms, where the random access signal includes 4 symbol groups, each symbol group consists of a cyclic prefix (CP) and 5 symbols, and each symbol group occupies one subcarrier in the frequency domain with the subcarrier spacing of 3.75 kHz. The structure of the random access signal is shown in FIG. 12, where CH i represents the location of the random access resources occupied by the four symbol groups corresponding to an ith random access signal, and i is greater than or equal to zero and less than or equal to 11. In this embodiment, if the frequency domain bandwidth of the uplink channel resource is 12 subcarriers, where the subcarrier spacing is 15 kHz and the time domain length of the uplink channel resource is 8 ms, the distribution of the resources used by the random access signal among the uplink channel resources is as shown in FIG. 13, and the random access signal occupies first 6.4 ms in the time domain and occupies the frequency domain bandwidth of 45 kHz in the frequency domain. Optionally, the random access signal is sent by using CH 2, CH 3, CH 8, and CH 9. Optionally, the frequency domain bandwidth of 45 kHz, which is occupied by the random access signal in the frequency domain, is located at the boundary of the frequency domain resources of the uplink channel resources.

In step 1107*a*, the base station sends TA update information to the terminal according to the downlink control channel search space.

Specifically, in this embodiment, if the base station sends the TA update information in the search space 1 shown in FIG. 8, the TA timer is reset, and thus, the time of sending the TA update information in the search space is T0.

In step 1107*b*, the terminal in the RRC-IDLE state sends uplink data on the uplink channel resource according to the TA update information.

In step 1108*a*, the base station sends a DCI to the terminal according to the downlink control channel search space, where the DCI carries the TA update information.

In step 1108*b*, the terminal in the RRC-IDLE state sends the uplink data on the uplink channel resource according to the DCI.

In step 1109*a*, the base station sends a random access response message to the terminal, where the random access response message carries the TA update information.

The base station may send the random access response message to the terminal after receiving the random access sequence Preamble, where the random access sequence Preamble is sent by the terminal on the random access channel.

Specifically, in this embodiment, if there is no new TA update information within the time period from T0 to T0+T1, when the time exceeds T0+T1, the terminal needs to send the non-contention-based random access sequence on the random access channel to allow the base station to measure the TA value and send the updated TA information to the terminal through the random access response message.

In step 1109*b*, the terminal in the RRC-IDLE state sends the uplink data on the uplink channel resource according to the random access response message.

The above-mentioned step 1107*a*, 1108*a*, and 1109*a* are in a coordinating relation.

Figure 14:
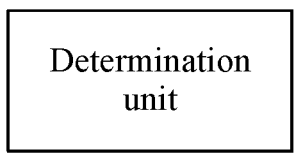
FIG. 14 is a structural diagram of a device for processing a TA according to another embodiment of the present disclosure.

FIG. 14 is a structural diagram of a device for processing a TA according to another embodiment of the present disclosure. As shown in FIG. 14, the device includes a determination unit.

The determination unit is configured to, in response to a first condition being satisfied, determine that a TA of a terminal is in an invalid state.

The first condition includes at least one of the following conditions.

In response to the terminal being a stationary terminal, a TA timer times out and a change amount of a first measurement value exceeds a first threshold.

In response to the terminal being a non-stationary terminal, the TA timer times out, or the change amount of the first measurement value exceeds the first threshold, or the TA timer times out and the change amount of the first measurement value exceeds the first threshold.

The first measurement value includes at least one of an RSRP, an RSRQ, a downlink SINR, a downlink SNR, an uplink SINR, an uplink SNR, a downlink path loss, or an uplink path loss.

The first measurement value is measured based on a first reference signal.

The first reference signal includes at least one of an SSB, a CSI-RS, a CRS, a DMRS, or a PTRS.

The number corresponding to the first reference signal is the number corresponding to an SSB in which configuration information of a random access channel used by the terminal for sending a random access signal is located.

Figure 15:
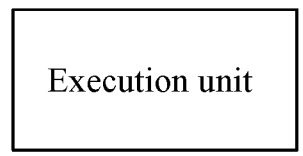
FIG. 15 is a structural diagram of a device for processing a TA according to another embodiment of the present disclosure.

FIG. 15 is a structural diagram of a device for processing a TA according to another embodiment of the present disclosure. The device is applied to a terminal, and as shown in FIG. 15, includes an execution unit.

The execution unit is configured to, in response to a TA of the terminal being in an invalid state, execute one of the following operations.

A random access signal used for a non-contention-based random access procedure is sent.

A random access signal on a first-type resource is sent.

The terminal sends a random access signal used for a contention-based random access procedure.

Signaling that triggers a non-contention-based random access procedure is received from the base station.

Signaling that triggers a contention-based random access procedure is received from the base station.

In response to a presence of a random access resource before a time T2 or an absence of the random access resource within a time period from T2 minus T3 to T2 before a next first-type resource, the execution unit sends the random access signal used for the contention-based random access procedure on the random access resource.

T2 is equal to the start time of the next first-type resource minus T1, and values of T1, T2, and T3 are configured by the base station or are each a default configuration value.

In response to a second condition being satisfied, the execution unit sends the random access signal on the first-type resource.

The second condition includes at least one of the following conditions.

No random access resource is present before the time T2.

No random access resource is present within the time period from T2 minus T3 to T2 before the next first-type resource.

The frequency domain bandwidth of the first-type resource is greater than or equal to the second threshold value.

The time domain length of the first-type resource is greater than or equal to the time domain length of the random access signal.

$P1+10*\log 10(R1/R2)$ is less than or equal to P2.

In $P1+10*\log 10(R1/R2)$, P1 is a transit power of the terminal for sending a random access signal at the current coverage enhancement level, P2 is a maximum transmit power of the terminal or a power threshold configured by the base station, R1 is the number of repeatedly sending by the terminal a random access signal at the current coverage enhancement level, and R2 is the number of repeatedly sending by the terminal a random access signal on the first-type resource. T2 is equal to the start time of the next first-type resource minus T1, and values of T1, T2, and T3 are configured by the base station or are each a default configuration value.

When the execution unit sends the random access signal used for the non-contention-based random access procedure, a time domain location of a random access channel for sending the random access signal is a TA timer reset time plus a random access channel after the time T1.

The value of T1 is configured by the base station or is a default configuration value.

In response to a third condition being satisfied, the execution unit receives from the base station the signaling that triggers the non-contention-based random access procedure or the execution unit receives from the base station the signaling that triggers the contention-based random access procedure.

The third condition includes at least one of the following conditions.

No random access resource is present before the time T2 and a fourth condition is not satisfied.

No random access resource is present within the time period from T2 minus T3 to T2 before the next first-type resource and the fourth condition is not satisfied.

The fourth condition includes at least one of the following conditions.

The frequency domain bandwidth of the first-type resource is greater than or equal to the second threshold value.

The time domain length of the first-type resource is greater than or equal to the time domain length of the random access signal.

$P1+10*\log 10(R1/R2)$ is less than or equal to P2.

In $P1+10*\log 10(R1/R2)$, P1 is a transit power of the terminal for sending a random access signal at the current coverage enhancement level, P2 is a maximum transmit power of the terminal or a power threshold configured by the base station, R1 is the number of repeatedly sending by the terminal a random access signal at the current coverage enhancement level, and R2 is the number of repeatedly sending by the terminal a random access signal on the first-type resource. T2 is equal to the start time of the next first-type resource minus T1, and values of T1, T2, and T3 are configured by the base station or are each a default configuration value.

Whether the TA is in the invalid state is determined through a TA timer.

Whether the TA is in the invalid state is determined according to whether a fifth condition is satisfied.

The fifth condition includes a change amount of a first measurement value exceeds a first threshold.

The first measurement value includes at least one of an RSRP, an RSRQ, a downlink SINR, a downlink SNR, an uplink SINR, an uplink SNR, a downlink path loss, or an uplink path loss.

The first measurement value is measured based on a first reference signal.

The first reference signal includes at least one of an SSB, a CSI-RS, a CRS, a DMRS, or a PTRS.

The number corresponding to the first reference signal is the number corresponding to an SSB in which configuration information of a random access channel used by the terminal for sending a random access signal is located.

Figure 16:
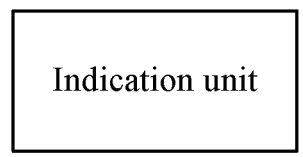
FIG. 16 is a structural diagram of a device for sending indication information according to an embodiment of the present disclosure.

FIG. 16 is a structural diagram of a device for sending indication information according to an embodiment of the present disclosure. The device is applied to a terminal, and as shown in FIG. 16, includes an indication unit.

The indication unit is configured to send first indication information to a base station.

The first indication information indicates at least one of the following information.

The TA of the terminal is in an invalid state.

The terminal fails to receive from the base station HARQ-ACK feedback information for uplink data sent on a first-type resource.

The coverage enhancement level of the terminal changes.

The serving cell of the terminal changes.

The number of repeatedly sending by the terminal the uplink data sent on the first-type resource changes.

The service mode of the terminal corresponding to the uplink data sent on the first-type resource changes.

The service mode changing includes at least one of the following cases.

A TBS corresponding to the uplink data sent on the first-type resource changes.

A transmission period corresponding to the uplink data sent on the first-type resource changes.

An embodiment of the present disclosure further provides an apparatus for processing a TA. The apparatus includes a memory, a processor, and a computer program stored in the memory and executable by the processor, where the computer program, when executed by the processor, implements the method for processing the TA described in any one of the above-mentioned embodiments.

An embodiment of the present disclosure further provides an apparatus for sending indication information. The apparatus includes a memory, a processor, and a computer program stored in the memory and executable by the processor, where the computer program, when executed by the processor, implements the method for sending the indication information described in any one of the above-mentioned embodiments.

An embodiment of the present disclosure further provides a computer-readable storage medium storing an information processing program, where the information processing program, when executed by a processor, implements the method for processing the TA described in any one of the above-mentioned embodiments.

An embodiment of the present disclosure further provides a computer-readable storage medium storing an information processing program, where the information processing program, when executed by a processor, implements the method for sending the indication information described in any one of the above-mentioned embodiments.

It is to be understood by those of ordinary skill in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have multiple functions, or one function or step may be performed jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage medium includes, but is not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other medium for storing desired information that can be accessed by a computer. Moreover, it is known to those of ordinary skill in the art that communication media typically include computer-readable instructions, data structures, program modules or other data in modulated data signals such as carrier waves or other transport mechanisms and may include any information delivery medium.

What is claimed is:

1. A method for processing a timing advance (TA), comprising:
   in response to a TA of a terminal being in an invalid state, executing one of the following operations:
   sending, by the terminal, a random access signal used for a non-contention-based random access procedure;
   sending, by the terminal, a random access signal on a first-type resource;
   sending, by the terminal, a random access signal used for a contention-based random access procedure;
   receiving, by the terminal from a base station, signaling that triggers the non-contention-based random access procedure; or
   receiving, by the terminal from the base station, a signaling that triggers the contention-based random access procedure;
   the method further comprises:
   determining, by the terminal, that a random access resource is presented before a time T2 or that no random access resource is presented within a time period from T2 minus T3 to T2 before a next first-type resource following the first-type resource, sending, by the terminal, the random access signal used for the contention-based random access procedure on the random access resource; wherein T2 is equal to a start time of the next first-type resource minus T1, and values of T1, T2, and T3 are configured by the base station or are each a default configuration value;
   or, the method further comprises:
   determining, by the terminal, that a second condition is satisfied, sending, by the terminal, the random access signal on the first-type resource;
   wherein the second condition comprises at least one of the followings:
   no random access resource is present before a time T2;
   no random access resource is present within the time period from T2 minus T3 to T2 before the next first-type resource following the first-type resource;
   a frequency domain bandwidth of the first-type resource is greater than or equal to a second threshold value;
   a time domain length of the first-type resource is greater than or equal to a time domain length of the random access signal; or
   $P1+10*\log 10(R1/R2)$ is less than or equal to P2, wherein P1 is a transit power of the terminal for sending a random access signal at a current coverage enhancement level, P2 is a maximum transmit power of the terminal or a power threshold configured by the base station, R1 is a number of repeatedly sending by the terminal a random access signal at the current coverage enhancement level, and R2 is a number of repeatedly sending by the terminal a random access signal on the first-type resource;
   wherein T2 is equal to the start time of the next first-type resource minus T1, and values of T1, T2, and T3 are configured by the base station or are each a default configuration value;
   or, the method further comprises:
   determining, by the terminal, that a third condition is satisfied, receiving, by the terminal from the base station, the signaling that triggers the non-contention-based random access procedure; or receiving, by the terminal from the base station, the signaling that triggers the contention-based random access procedure;
   wherein the third condition comprises at least one of the followings:
   no random access resource is present before the time T2 and a fourth condition is not satisfied; or
   no random access resource is present within the time period from T2 minus T3 to T2 before the next first-type resource following the first-type resource and the fourth condition is not satisfied;
   wherein the fourth condition comprises at least one of the followings:
   the frequency domain bandwidth of the first-type resource is greater than or equal to the second threshold value;

the time domain length of the first-type resource is greater than or equal to the time domain length of the random access signal; or P1+10*log 10(R1/R2) is less than or equal to P2, wherein P1 is a transit power of the terminal for sending a random access signal at a current coverage enhancement level, P2 is a maximum transmit power of the terminal or a power threshold configured by the base station, R1 is a number of repeatedly sending by the terminal a random access signal at the current coverage enhancement level, and R2 is a number of repeatedly sending by the terminal a random access signal on the first-type resource;

wherein T2 is equal to the start time of the next first-type resource minus T1, and values of T1, T2, and T3 are configured by the base station or are each a default configuration value;

wherein the first-type resource and the next first-type resource are periodically distributed or discrete in a time domain.

2. The method of claim 1, wherein in response to the terminal sending the random access signal used for the non-contention-based random access procedure, a random access channel for sending the random access signal is a random access channel after a TA timer reset time plus a time T1;

wherein the value of T1 is configured by the base station or is a default configuration value.

3. The method according to claim 1, further comprising: determining whether the TA is in the invalid state through a TA timer.

4. The method of claim 1, further comprising: determining whether the TA is in the invalid state according to whether a fifth condition is satisfied;

wherein the fifth condition comprises a change amount of a first measurement value exceeds a first threshold.

5. The method of claim 4, wherein the first measurement value comprises at least one of:

a reference signal receiving power (RSRP), a reference signal receiving quality (RSRQ), a downlink signal-to-interference-plus-noise ratio (SINR), a downlink signal-to-noise ratio (SNR), an uplink SINR, an uplink SNR, a downlink path loss, or an uplink path loss.

6. The method of claim 5, wherein the first measurement value is measured based on a first reference signal;

wherein the first reference signal comprises at least one of: a synchronization signal block (SSB), a channel state information-reference signal (CSI-RS), a cell-specific reference signal (CRS), a UE-specific demodulation reference signal (DMRS), or a phase-tracking reference signal (PTRS).

7. The method of claim 6, wherein a number corresponding to the first reference signal is a number corresponding to an SSB, and configuration information of a random access channel used by the terminal for sending a random access signal is located in the SSB.

8. The method of claim 1, further comprising:

determining that a first condition is satisfied, then determining that a TA of a terminal is in an invalid state;

wherein the first condition comprises at least one of the followings:

determining that the terminal is a stationary terminal, a TA timer times out and a change amount of a first measurement value exceeds a first threshold; or determining that the terminal is a non-stationary terminal, the TA timer times out, or the change amount of the first measurement value exceeds the first threshold, or the TA timer times out and the change amount of the first measurement value exceeds the first threshold.

9. The method of claim 8, wherein the first measurement value comprises at least one of:

a reference signal receiving power (RSRP), a reference signal receiving quality (RSRQ), a downlink signal-to-interference-plus-noise ratio (SINR), a downlink signal-to-noise ratio (SNR), an uplink SINR, an uplink SNR, a downlink path loss, or an uplink path loss.

10. The method of claim 9, wherein the first measurement value is measured based on a first reference signal; and the first reference signal comprises at least one of: a synchronization signal block (SSB), a channel state information-reference signal (CSI-RS), a cell-specific reference signal (CRS), a UE-specific demodulation reference signal (DMRS), or a phase-tracking reference signal (PTRS).

11. The method of claim 10, wherein a number corresponding to the first reference signal is a number corresponding to an SSB, and configuration information of a random access channel used by the terminal for sending a random access signal is located in the SSB.

12. An apparatus for processing a timing advance (TA), comprising a memory, a processor, and a computer program stored in the memory and executable by the processor, wherein the computer program, when executed by the processor, implements the method of claim 1.

13. A non-transitory computer-readable storage medium storing an information processing program, wherein the information processing program, when executed by a processor, implements the method of claim 1.

* * * * *